United States Patent

Brown et al.

[11] 3,895,960
[45] July 22, 1975

[54] DIFFUSION-BONDED BATTERY ELECTRODE PLAQUES

[75] Inventors: Jack T. Brown; William Feduska, both of Pittsburgh, Pa.; Wesley L. Bradford, Pentress, W. Va.

[73] Assignee: Westinghouse Electric Corporation, Pittsburgh, Pa.

[22] Filed: Aug. 27, 1970

[21] Appl. No.: 67,567

[52] U.S. Cl. .................................................. 136/36
[51] Int. Cl. .......................................... H01m 35/04
[58] Field of Search ............ 136/36, 37, 20, 23, 24, 136/28, 30, 120, 74; 117/227, 230, 131, 231; 75/200, DIG. 1; 29/413, 471.1, 193

[56] References Cited
UNITED STATES PATENTS

| | | | |
|---|---|---|---|
| 2,627,531 | 2/1953 | Vogt | 136/20 |
| 3,241,227 | 3/1966 | Beigh | 29/471.1 |
| 3,262,815 | 7/1966 | Langer et al. | 136/36 |
| 3,266,936 | 8/1966 | Krebs | 136/36 |
| 3,489,534 | 1/1970 | Levinstein | 29/193 |

FOREIGN PATENTS OR APPLICATIONS

| | | | |
|---|---|---|---|
| 670,498 | 9/1963 | Canada | 136/36 |
| 821,690 | 10/1959 | United Kingdom | 29/192 R |

Primary Examiner—John H. Mack
Assistant Examiner—C. F. Lefevour
Attorney, Agent, or Firm—D. P. Cillo

[57] ABSTRACT

A flexible electrode plaque having 75 to 95 per cent porosity is made from at least one sheet of diffusion bonded iron fibers, 0.0002 to 0.015 inches in diameter, having an attached metal tab lead. A uniform coating of nickel metal is plated on the iron fibers, after the fibers are bonded together.

4 Claims, 3 Drawing Figures

PATENTED JUL 22 1975  3,895,960

DIFFUSION-BONDED BATTERY ELECTRODE PLAQUES

CROSS REFERENCE TO RELATED APPLICATIONS

This application is a continuation-in-part of our pending application U.S. Ser. No. 764,527, filed on Oct. 2, 1968, now abandoned.

BACKGROUND OF THE INVENTION

This invention relates to a new type flexible electrode plaque, suitable for use in alkaline battery systems, typified by the silver-zinc, silver-cadmium, nickel-iron and in particular, the nickel-cadmium system.

Various types of electrode plaques for alkaline secondary batteries have been tried. One type taught by Langer in U.S. Pat. No. 3,262,815, consists of a loose metal fiber sheet. Active material is allowed to settle into this sheet and the composite is pressed to form a thin, compact electrode plate.

Three problems exist with this loose metallic fiber plaque:

1. The loose fibers present a structure that is weak and cannot physically support maximum loadings of active materials. 2. Plate volume when loaded is too large, resulting in a lower surface area of active material per unit volume of plate than would be normally required for very high drain rates. 3. The electrical resistance of the loose fiber plaque is quite high, which in turn produces cells having high internal resistance, an undesirable characteristic of high drain rate cells.

Another electrode support is taught by Krebs in U.S. Pat. No. 3,266,936. The Krebs structure contains large numbers of clefts and protuberances due to melting of fibers. Such a structure while providing a large fiber surface area, decreases the plaque pore volume.

A frequently used structure is the sintered, powder plate plaque. This plaque is prepared by sintering layers of fine carbonyl nickel powder, which has been spread over an embedded grid of screen wire or fibers or nickel plated steel strip which has been perforated with numerous holes. This type of plaque, typified by Vogt, U.S. Pat. No. 2,627,531, though standard in the battery industry, has disadvantages of inflexibility, and because of the very small sinter bond regions between the fine powder particles, there is not a particularly low effective electrode resistance, thereby raising the overall cell electrical resistance.

SUMMARY OF THE INVENTION

Accordingly, it is the object of this invention to provide a new and improved type of flexible electrode plaque for use in alkaline batteries and particularly in nickel-cadmium systems.

It is a further object to provide a method of making diffusion bonded, iron fiber base electrode plaques having a large active material pore volume.

Our invention accomplished the foregoing objects by following these steps: (1) Degreasing sheets of loose steel wool fibers, having a diameter between .0002 and .015 inches, in a suitable solvent, such as trichloroethylene, and then pressing the fibers into physical contact with each other, (2) In a vacuum, inert, or protective atmosphere, diffusion bonding the fibers at 800°–1300°C for 5 minutes to several hours. While applying sufficient compressive pressure with a weight, press, or other pressing means, to produce 75 to 95 percent porosity in the final plaque (i.e. 5 to 25 percent of theoretical density) (3) Attaching by suitable welding technique or by other means a metal tab to the pressed bonded fibers and (4) Plating the diffusion bonded plaque by standard plating procedures.

The diffusion-bonded metallic fiber electrode plaque is considerably thinner and therefore has more fibers and surface area per unit volume than plaques heretofore known. In the bonding process, the atoms interdiffuse across the interface of the fibers in the solid state to produce a true iron to iron metallurgical bond. Such a method does not melt the metal fibers and so iron globules are not formed, providing more pore volume within the plaque for active material leading. Such bonding causes the entire structure to be considerably stronger while still remaining flexible. The diffusion bonding process also lowers the electrode resistance appreciably, which is effective in lowering internal cell resistance in a finished cell.

BRIEF DESCRIPTION OF THE DRAWINGS

For a better understanding of the nature and objects of the invention, reference may be had to the drawings in which.

DESCRIPTION OF THE PREFERRED EMBODIMENTS

Figure 1:
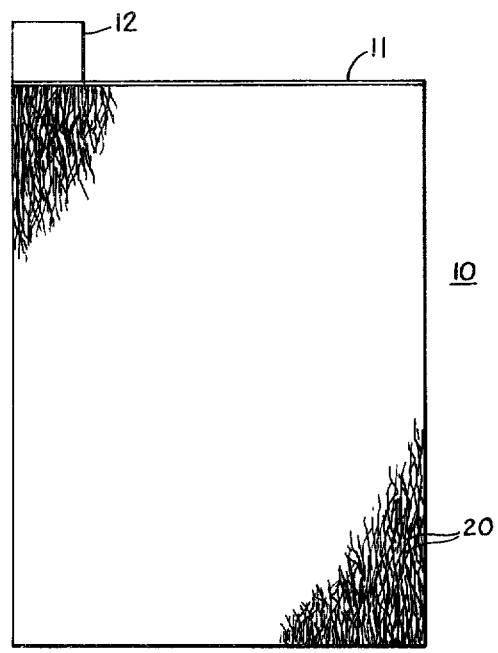
FIG. 1 shows one configuration of our unloaded electrode plaque.
Figure 2:
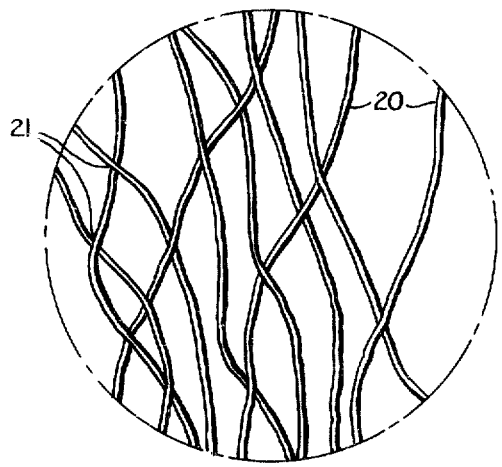
FIG. 2 shows a magnified view of the diffusion bonded metallic fibers of the plaque.

Referring to FIG. 1 of the drawing, an electrode plaque 10 comprises at least one diffusion bonded metallic fibrous sheet with an attached tab. The sheet is shown after diffusion bonding at great magnification in FIG. 2 and consists of compacted intermingled fine conductive fibers 20 such as steel wool fibers. The fibers are diffusion bonded at their contact points to form iron to iron metallurgical bonds at a multiplicity of crossover points 21 in each sheet, and are diffusion bonded to form iron to iron metallurgical bonds between fibers of adjacent sheets in the plaque. Active material will be contained in the pore area between the bonded fibers in the loaded plaque. In the process, the fibers must not be melted together, there must only be an interdiffusion of atoms across the fiber interface. The iron fibers can be coated, but only after diffusion bonding to insure low electrical resistivity in the coated fiber structure. It should be apparent from FIG. 2 and the description herein that the fibers are relatively smooth and even and are essentially free of clefts and protuberances. Also, the plaque consists only of metal fibers into which active material is directly intruded. There are no metal powder particles nor a metal sponge structure.

The flexible fibrous plaques 10 shown in FIG. 1 may have a fine conductive metal band or wire across the length of the plaque 11 and a conductive metal lead tab 12 attached to the wire or band. Active electrode material can be disposed in the interstices of the body of the fibrous plaque. Both positive and negative battery plaques may be made using this construction. The difference between the positive and negative electrodes resides in the active electrode material applied or, in some cases, the metallic coatings (copper, nickel, silver, zinc or cadmium) applied to the metal plaques after diffusion bonding.

The electrical conductivity as well as the electrode characteristics of the bonded fiber plaque may be improved by coating the bonded plaques of steel wool or iron fibers with one or more essentially continuous, thin layers, about 0.0001 to 0.001 inches thick of electrically conductive material. In particular, electrodeposits of metals such as copper, nickel, silver, zinc and cadmium help improve the efficiency and life of the electrode providing such coating does not constitute an impurity element for the intended electrode system. The choice of coating is determined by the type of battery system in which the plaque is to be used.

Extra fine, commercially available steel wool is found to be an unusually suitable and economical material for the electrode plaque construction of this invention. Especially suitable is grade 000 steel wool which is available in the form of a long sheet of generally parallel, intermingled, substantially unidirectional fibers which, when uncompacted, averages approximately 0.25 inch in thickness. These intermingled fibers are relatively smooth and exceed 1.5 inches in length, being essentially continuous for the entire length of the electrode plaque. Excellent results have been had with steel wool fibers about 1.5 inches long having a diameter ranging from 0.0002 inches to 0.0136 inches. The average diameter of the 000 grade of steel wool fibers is 0.0008 inches. The steel wool is basically a low carbon steel, but the plaque may comprise nearly pure iron. The plaques used were about 0.025 inches thick and consisted of two sheets of 000 grade steel wool fibers. The generally parallel fibers of each sheet as well as fibers of the adjacent sheet were pressed to insure physical contact and metallurgically bonded together so as to produce plaques having a uniform density. The temperature that can theoretically be used ranges up to the melting point of the fibers used. The fibers must not be melted together or the pore volume of the plaque will be full of iron globules. Practically, the temperature should range from about 800° to about 1300°C. The atmosphere used during diffusion bonding to prevent oxidation of the fibers should be inert and/or protective, as for example, argon, hydrogen, nitrogen, helium and dissociated ammonia. A vacuum can also be used. The density of the plaque for good results (maximum loading of active material) must be between 5 to 25 percent of theoretical density (i.e. 75 to 95 percent porosity).

Various methods and pressing means can be used to achieve this density. For example the steel wool weight and surface area can be determined. During bonding a weight can be placed on the sheets causing them to assume a more compact, form, so that, a desired thickness can be attained. This thickness would be equal to the weight/(area multiplied by desired percent of density). Also, after bonding a plaque can be pressed to the desired thickness to give the desired density.

An electrically conducting band such as a fine nickel wire, is attached to one end of the metallic fiber sheet in electrical contact with the ends of the iron fibers by threading, welding or other suitable connecting technique. To this conducting band a conductive metal tab lead of, for example, nickel, is attached by mechanical means, brazing, soldering, welding or the like.

Suitable basic active electrode materials for improved positive electrodes are silver oxide and nickel hydroxide. The suitable basic active electrode materials for improved negative electrodes are zinc hydroxide, cadmium hydroxide and iron hydroxide.

Certain metal compound additives such as cobalt hydroxide may be incorporated in the active electrode material to improve electrode functioning by preventing, or retarding any portion of the active material from becoming coated with inert material during use, and by increasing electrical conductivity between particles as well as helping produce finer particles of active electrode material.

The plaques can be loaded with active material by any suitable method such as, for example, pouring an aqueous slurry of active material over the plaque and then applying a slight vacuum.

Figure 3:
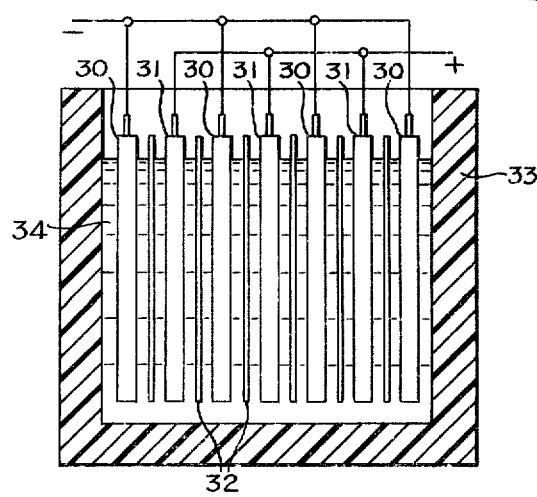
FIG. 3 shows a nickel cadmium battery utilizing loaded electrode plaques of this invention.

In further accord with this invention, batteries shown in FIG. 3 were made. They consisted of a plurality of loaded negative plaques 30 and loaded positive plaques 31 with separators 32 therebetween. They were encased in a suitable container 33, electrolyte 34 was introduced and through the electrical connections provided on the battery, the loaded plaques were cycled through charging and discharging periods. The principal batteries studied consisted of nickel coated positive plaques loaded with nickel hydroxide and nickel coated negative plaques loaded with cadmium hydroxide active material. The battery combinations are numerous and depend on the system desired and the consequent coatings and active material used. Loaded, coated plaques can be coupled to form a cell and multiple cells may be employed to produce a battery.

EXAMPLE I

Two 3 inch × 4 inch sheets of 000 grade steel wool (intermingled fibers about 1.5 inches long and 0.00078 inches in diameter) were cut from a spool, degreased in trichloroethylene and dried. The total weight of the sheets was 1.9 grams and the flat planar surface area of the sheet was 12 square inches. The two sheets were pressed, at about 2 pounds per square inch of metallic sheet by applying a weight, to bring the fibers in contact with each other, and then diffusion bonded together in an argon atmosphere at 1000°C for 10 minutes. The fibers were not melted during this process. To prevent sticking of the plaque to the weight during diffusion bonding, a borosilicate glass plate was used between the steel wool and the weight. The resulting diffusion bonded plaque was allowed to compact to 0.025 inches in thickness. This gave us a plaque about 5 percent dense (95 percent porous) i.e. the percent density of the plaque equals: weight/(area)(thickness)(density of steel) or $(1.9 \text{ gr})/(12 \text{in}^2)(0.025 \text{ in})(126 \text{gr/in}^3)$ equals 5 percent density. A fine nickel wire was then welded across the length of the plaque and two pure nickel strips were spot welded to this wire conductive band to act as the electrical tab leads. The plaque was cut to size (2 inches × 2 inches) and uniformly nickel plated (about 0.0002 inches thick) in a standard watts bath. It is essential to diffusion bond before plating. If plating precedes diffusion bonding, the nickel plating and steel base metal form a high resistance nickel-iron alloy during diffusion bonding which results in a high internal resistance and subsequent poor battery properties.

EXAMPLE II

Batteries were constructed with a plurality of negative plates in parallel, a plurality of positive plates in parallel, separators, a battery case, and electrolyte of 25 weight percent potassium hydroxide. The positive plates consisted of steel wool diffusion bonded plaques made in accordance with Example I, plates with a uniform nickel coating and loaded with nickel hydroxide active material. The negative plates consisted of steel wool diffusion bonded plaques made in accordance with Example I, plated with a uniform nickel coating, having nickel tabs and loaded with cadmium hydroxide active material.

The batteries prepared exhibited a performance comparable to the best batteries produced by prior methods known to those skilled in the art, and owing to the advantage of their construction, weigh far less per unit of energy and having a large pore volume between fibers, and are able to contain more active material per unit volume.

We found that the diffusion bonding process lowers electrode resistance appreciably. Whereas a cell having an electrode plaque 2 inches × 2 inches which is nickel plated but not diffusion bonded may have a resistance of 25 milliohms, a diffusion bonded and nickel plated electrode plaque the same size would have a measured resistance of only 5 milliohms.

The most important feature of the diffusion-bonded nickel plated iron fiber electrode plaque is that we can potentially incorporate about twice as much active material per unit volume in a lighter, stronger, flexible electrode structure than can be loaded into present-type commercial powder plate, nickel-cadmium cell electrode plaques. At the same time the required high drain rate features are still retained. For example, the diffusion-bonded structure which is 5 percent dense can theoretically hold 18.3 ampere-hours per cubic inch of stored charge (positive plate), while the present commercial structure can theoretically hold only 8.5 ampere-hours per cubic inch (positive plate).

We claim as our invention:

1. A method of producing battery electrode plaques by:
   1. providing a sheet of intermingled relatively smooth unoxidized metallic fibers being essentially free of clefts and protuberances, said fibers having a diameter of about 0.0002 to 0.015 inches, and then
   2. establishing physical contact between said unoxidized smooth fibers, and then
   3. maintaining said physical contact between said unoxidized smooth fibers and heating the sheet of unoxidized smooth fibers in a non-oxidizing atmosphere to form a metallurgical bond of interdiffused unmelted metal between fibers at points of physical contact by an interdiffusion of atoms between the fibers, and finally
   4. depositing a metal coating on the bonded fibers of said sheet, to form an electrode plaque of bonded coated fibers essentially free of clefts and protuberances.

2. The method of claim 1 wherein said metallic fibers are selected from the group consisting of steel and iron, the sheet is heated to a temperature of about 800° to 1300°C to cause an interdiffusion of atoms between the fibers and said metal coating is of a metal selected from the group consisting of nickel, cadmium, copper, silver and zinc.

3. The method of claim 1 wherein a plurality of sheets are provided, the sheets are stacked together and a pressure is imposed upon the stack so that fibers of one sheet are in physical contact with fibers of another sheet and the stack is heated to form said metallurgical bonds between fibers.

4. The method of claim 2 wherein the fibers have an average diameter of about 0.0008 inches, the electrode plaque is 75 to 95 percent porous, and the metal coating deposited over the fibers is a nickel coating having a thickness from about 0.0001 to 0.001 inches.

* * * * *